United States Patent
Broemmelsiek (10) Patent No.: US 6,867,799 B2
(45) Date of Patent: Mar. 15, 2005

(54) METHOD AND APPARATUS FOR OBJECT SURVEILLANCE WITH A MOVABLE CAMERA

(75) Inventor: Raymond M. Broemmelsiek, San Diego, CA (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 701 days.

(21) Appl. No.: 09/801,483

(22) Filed: Mar. 7, 2001

(65) Prior Publication Data

US 2002/0030741 A1 Mar. 14, 2002

Related U.S. Application Data (60) Provisional application No. 60/188,171, filed on Mar. 10, 2000.

(51) Int. Cl.[7] .............................................. H04N 5/225
(52) U.S. Cl. ...................... 348/169; 382/103; 396/102
(58) Field of Search .................................. 348/169, 143, 348/149, 154, 157, 161, 170, 349; 396/102; 382/103, 107

(56) References Cited

U.S. PATENT DOCUMENTS

| | | | | |
|---|---|---|---|---|
| 5,329,368 A | | 7/1994 | Plotke ......................... 348/701 |
| 5,387,768 A | | 2/1995 | Izard et al. ................. 187/392 |
| 5,434,617 A | * | 7/1995 | Bianchi ....................... 348/170 |
| 5,434,621 A | | 7/1995 | Yu .............................. 348/347 |
| 5,473,369 A | | 12/1995 | Abe ............................ 348/169 |
| 5,629,988 A | | 5/1997 | Burt et al. .................. 382/276 |
| 5,694,625 A | * | 12/1997 | Watanabe et al. ........... 396/102 |
| 5,739,856 A | * | 4/1998 | Watanabe .................... 348/349 |
| 5,754,225 A | | 5/1998 | Naganuma ................... 348/155 |
| 5,798,787 A | | 8/1998 | Yamaguchi et al. ......... 348/152 |
| 5,878,151 A | * | 3/1999 | Tang et al. .................. 382/103 |
| 5,991,428 A | * | 11/1999 | Taniguchi ................... 382/107 |
| 6,650,360 B1 | * | 11/2003 | Osen ........................... 348/157 |

\* cited by examiner

*Primary Examiner*—Gims Philippe (57) ABSTRACT

A method for holding an object of interest in a field of view of a movable video camera, the object of interest being selected from a plurality of moving objects detected in the field of view, is taught. An indication of the object of interest is received and is used to predict a future position thereof. Movement commands for the camera are created based on the future position of the object of interest such that the object of interest remains in the field of view of the camera.

27 Claims, 5 Drawing Sheets

FIG. 5

METHOD AND APPARATUS FOR OBJECT SURVEILLANCE WITH A MOVABLE CAMERA

CROSS REFERENCE TO RELATED APPLICATIONS

This application claims the benefit of U.S. provisional patent application Ser. No. 60/188,171 filed on Mar. 10, 2000. United States patent applications, also claiming the benefit of U.S. Provisional application 60/188,171, and entitled "Method and Apparatus for Video Surveillance With Defined Zones" and "Method an Apparatus for Object Tracking and Detection" were filed concurrently herewith.

FIELD OF THE INVENTION

The present invention relates to a method and system for object tracking with a video camera.

BACKGROUND OF THE INVENTION

There are several shortcomings in current video surveillance systems that need to be overcome for widespread use of automatic detection and collection of relevant video data in response to scene stimulus without the need of a human operator present. When viewing a scene from a video camera a large amount of data is generated. The vast amount of data created produces a data reduction problem. Automatically detecting and accurately and reliably collecting image information of a moving object using a motion video camera is a difficult task. This task is made even more difficult when trying to detect, track and maintain camera line-of-sight using a single motion video camera without requiring human intervention.

U.S. Pat. No. 5,473,369 (Abe) describes the use of a camera to detect and track a moving object without using conventional block matching. In the system described in Abe single object tracking is performed only after an object is placed within a frame on a screen; however, there is no user input device for manual target selection Moreover, Abe does not provide for camera movement to maintain line-of-site.

Other prior art solutions provide for image stabilization for a camera in arbitrary motion without object tracking functionality. U.S. Pat. No. 5,629,988 (Burt) teaches electronic stabilization of a sequence of images with respect to one another but provides no tracking facility.

Still other prior art solutions control camera movement to maintain line-of-sight between camera and object but lack arbitrary motion compensation or do not provide for automatic and user selected object tracking. U.S. Pat. No. 5,434,621 (Yu) teaches a method for automatic zooming and automatic tracking of an object using a zoom lens but does not provide for reorienting the camera's line-of-sight.

Many prior art system in the field lack optical zoom for maintaining object size within field-of-view. Efforts have been made to simultaneously support near field and far field tracking using two cameras.

SUMMARY OF THE INVENTION

It is an object of the present invention to provide a method and apparatus for monitoring objects of interest with a movable camera.

It is an object of the present invention to provide a method and apparatus for monitoring objects of interest with a single movable camera in an improved size field of view.

It is an object of the present invention to provide a method and apparatus for motion video tracking with optical zoom for collecting and improving information content.

In accordance with one aspect of the present invention there is provided a method for holding an object of interest in a field of view of a movable video camera, the object of interest being selected from a plurality of moving objects detected in the field of view, said method comprising the steps of: receiving an indication of the object of interest; predicting a future position of the object of interest based on a current position and movement parameters of the object of interest; determining a future position of the movable camera based on said future position of the object of interest, said future position of the movable camera having the object of interest in the field of view; and generating movement signals for the movable camera based on a difference between a current position of the movable camera and said future position of the movable camera.

In accordance with another aspect of the present invention there is provided a method for holding an object of interest selected by a user in a field of view of a movable camera, the movable camera producing a video signal representative of the field of view, said method comprising the steps of: detecting moving objects in the video signal; transmitting an indication of said detected moving objects and the video signal at a first time point; receiving an indication of the selected object of interest at a current time point; translating said indication of the selected object of interest from the video signal transmitted at said first time point to an object in the video signal at said current time point; predicting a future position of said selected object of interest based on a current position and movement parameters of said selected object of interest; determining a future position of the movable camera based on said future position of said selected object of interest; and generating movement signals for the movable camera based on a difference between a current position of the movable camera and said future position of the movable camera.

In accordance with a further aspect of the present invention there is provided a system for holding an object of interest in a field of view of a movable video camera, the object of interest being selected form a plurality of moving objects detected in the field of view, said system comprising: a selector for selecting the object of interest; means for predicting a future position of the object of interest and a coordinating future position of the movable video camera; a movement coordinator for creating movement signals to move the movable video camera to said future position from a current position.

In accordance with yet another aspect of the present invention there is provided a system for holding an object of interest selected by a user in a field of view of a movable camera, the movable camera producing a video signal representative of the field of view, said system comprising: an object detector for detecting moving objects in the field of view of the video camera; means for transmitting and receiving video information for transmitting the video signal and said detected moving objects and receiving an indication of the selected object of interest; a translator for determining an object of interest at a current time point based on a video signal transmitted at a first time point and said indication of the selected object of interest received at said current time point; means for predicting a future position of the object of interest and a coordinating future position of the movable video camera; a movement coordinator for creating movement signals to move the movable video camera to said future position from a current position.

In accordance with a further aspect of the present invention there is provided a computer readable medium having stored thereon computer-executable instructions for holding an object of interest in a field of view of a movable video camera, the object of interest being selected from a plurality of moving objects detected in the field of view performing the steps comprising: receiving an indication of the object of interest; predicting a future position of the object of interest based on a current position and movement parameters of the object of interest; determining a future position of the movable camera based on said future position of the object of interest, said future position of the movable camera having the object of interest in the field of view; and generating movement signals for the movable camera based on a difference between a current position of the movable camera and said future position of the movable camera.

In accordance with an aspect of the present invention there is provided a computer readable medium having stored thereon computer-executable instructions for holding an object of interest selected by a user in a field of view of a movable camera, the movable camera producing a video signal representative of the field of view performing the steps comprising: detecting moving objects in the video signal; transmitting an indication of said detected moving objects and the video signal at a first time point; receiving an indication of the selected object of interest at a current time point; translating said indication of the selected object of interest from the video signal transmitted at said first time point to an object in the video signal at said current time point; predicting a future position of said selected object of interest based on a current position and movement parameters of said selected object of interest; determining a future position of the movable camera based on said future position of said selected object of interest; and generating movement signals for the movable camera based on a difference between a current position of the movable camera and said future position of the movable camera.

DETAILED DESCRIPTION

The present invention relates to tracking moving objects using a single movable video camera and processing the video camera signal such that multiple objects can be tracked and maintained within the camera's field of view. It is therefore possible to automatically detect moving objects, automatically or manually select a moving object and direct the camera's line-of-sight to maintain the selected object within the camera's field of view. This enables objects to be monitored in a larger field of view with a single movable camera than would otherwise be possible.

Figure 1:
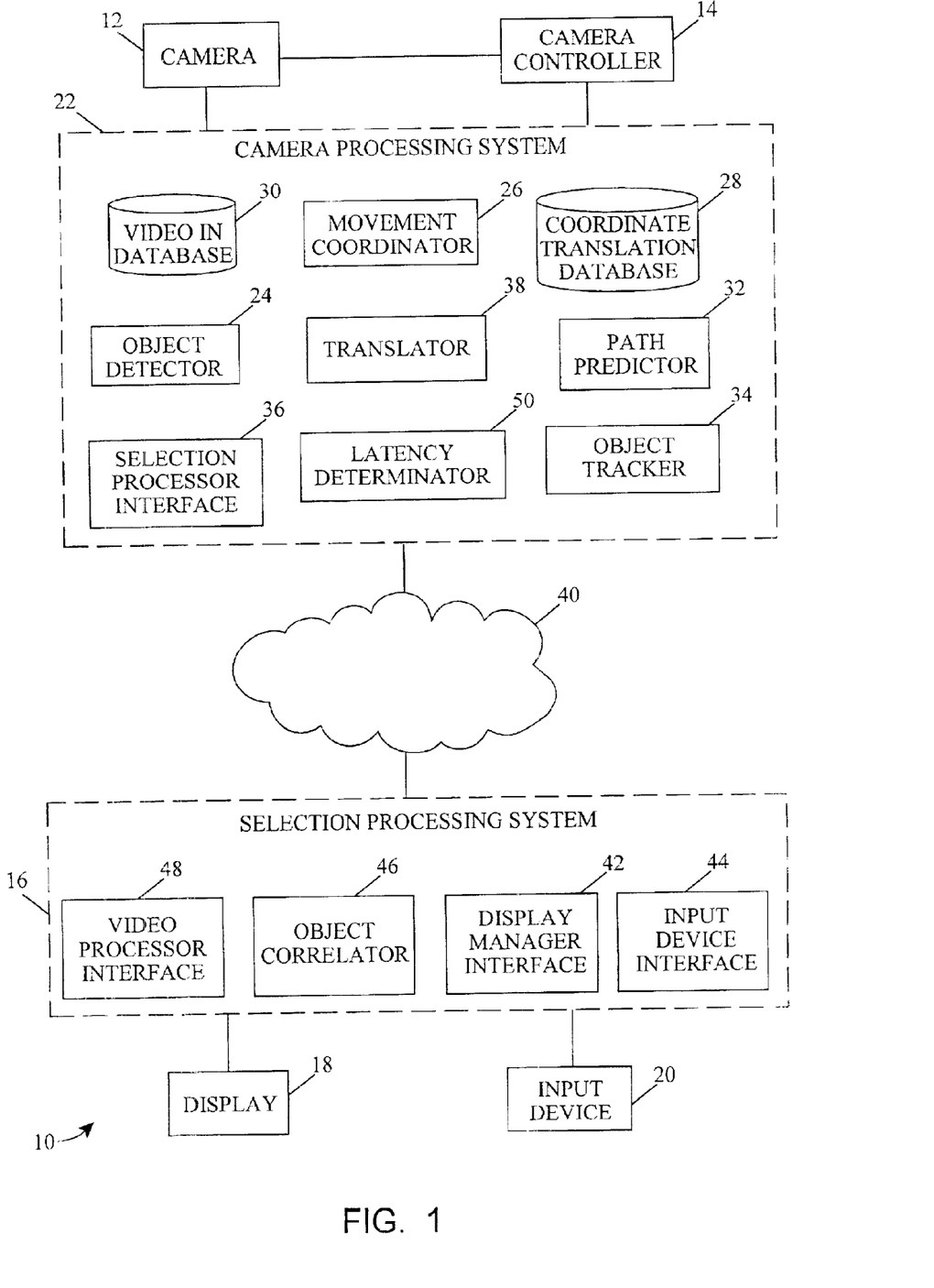
FIG. 1 is a functional diagram of a monitoring system with a selection means provided remote from a motion video camera according to a first embodiment of the present invention.

FIG. 1 shows a system 10 for monitoring moving objects using a single movable camera 12 attached to a camera controller 14. The video camera 12 collects motion video data and sends a motion video signal to a camera processing system 22 located on site with the camera 12. The motion video signal is composed of a number of frames each having a unique frame number associated therewith. The camera processing system 22 is connected to a remotely located selection processing system 16 over a network 40, such as a wide area network (i.e. the Internet).

The camera processing system 22 creates camera control signals that keep object(s) being tracked by the system 10 centered in the field of view of the camera 12. The processing system 16 creates these control signals from a prediction of future movement based on past and current movement of the object(s) being tracked.

The camera processing system 22 has an object detector 24 that automatically detects moving objects in the field of view of the camera 12. The object detector applies a technique to the received video signal to isolate moving objects, which are considered to be detected objects once they have been isolated. Object detection may be accomplished using any number of methods for image segmentation known in the art. For example, motion detection may be performed by frame differencing sequential pairs of video frames and applying thresholding techniques thereby yielding pixels within the processed image that reflect motion of objects within the field of view of the camera 12. Additional image processing techniques such as centroid analysis may then be applied to remove spurious motion. Object tracking and detection is discussed in greater detail in applicant's co-pending related application entitled "Method and Apparatus for Object Tracking and Detection," filed concurrently herewith and incorporated herein by reference.

Detected objects area associated with video frames in which they are found. These objects are represented by a unique object identification number, the position of the object and the video frame number. Each video frame may be represented by its identifying video frame number and a list of all objects (by identification number) that are present in the frame.

The video signal in received from the camera 12 and an indication of all moving objects detected by the object detector 24 are received by a remote processor interface of the camera processing system 22 where they are sent over the network 40 to the remotely located selection processing system 16. During the delay between when a signal is sent to the selection processing system 16 and a response is received, a predetermined number of video frames are stored in a video in database 30. These data frames will be used to coordinate information between a current signal in and the signal on which the response was based due to the latency between sending the video and receiving a response.

The selection processing system 16 is connected to a display 18 and a user input device 20 by which user input can be accepted and used for control of the camera 12. The video signal in and indication of the detected moving objects is received by a video processor interface 48 of the selection processing system 16. The video signal in and the detected moving objects indicators are passed to a display manager interface 42 where the two types of information are combined to produce a video signal displaying an indication of the selected moving objects. This combined signal is displayed by the display 18.

The display manager interface 42 also provides an indicator for assisting a user in selecting displayed objects. The user selects one or more of the displayed objects using the input device 20. An input device interface 44 of the selection processing system 16 receives input from the user indicating selected objects. This indication is passed to an object correlator 46 where the video signal in, the indication of the detected objects and the indication of the selected objects are coordinated to determine the coordinates of the selected object. The coordinates may be combined with a frame number of the frame from which the object was selected. These coordinates are sent by the video processor interface 48 back to the camera processing system 22 via the network 40.

The selection processor interface 36 receives the coordinates of the selected object and forwards this information to a remote selection to current frame translator 38. The translator 38 consults a latency determinator 50 to receive the delay, in number of frames, between the frame on which the selection was based and the current frame of the video signal in.

The latency calculation may be performed in a number of ways. A time stamp or frame number may be sent to the selection processing system 16 and then returned with the selected objects indication. The video signal frames stored in the video in database 30 may then be queried to determine the frame on which the selection was based. Alternatively, a ping may be sent to the selection processing system 16. When the ping is detected as being received by the latency determinator 50 the round trip latency may be calculated according to the time between the sending and receiving of the ping. Based on this time the video in database 30 may be queried to determine the frame that was current when the signal was first sent to the selection processing system 16.

The latency determinator 50 provides the translator 38 with an indication of the frame in the video in database 30 on which the selection received was based. The translator 38 provides an object tracker 34 with an indication of the frame and selected object. The object tracker 34 determines the position of the selected object and uses subsequent frames to determine the position of the object in the current video frame. The position of the object in the current frame is provided to the translator 38. Alternatively, the current position of the object may be based on the object identification number such that if an object is currently being tracked but was previously selected, its current position may be determined based on the object identification number and the corresponding object in the current frame.

The translator 38 passes the current position information of the selected object to the path predictor 32 where the future path of the object is detected in order to proactively move the camera 12 to maintain the object in the field of view. The path predictor 32 predicts possible future movement paths using a state prediction algorithm, such as the Kalman filter. Kalman filtering is a time-based method of predicting variables, such as position, velocity and acceleration, based on current samples of these variables. The predicted path is based on a digital time based system. The sample rate of the predicting variables is based on a data rate of the system, which is determined by regional video standards (i.e. North American standard is 30 frames/second whereas the European standard is 25 frames/second). Coordinates of a display, representative of the camera's 12 field of view, are use by the Kalman filter to determine a future position.

The predicted position of the selected object is used by a movement coordinator 26 to keep the object in the field of view of the camera 12. The current position of the object within the field of view of the camera 12 and the position of the field of view of the camera 12 are determined in display coordinates or pixels associated with the field of view of the camera 12. Based on the predicted position of the object, the amount of movement of the camera 12 necessary to maintain the object in the center of the field of view is determined. Horizontal and vertical movement are determined according to a display coordinate change of the object. The difference between the current and future positions is used to determine how much the camera 12 will need to move in order to maintain the object in its field of view.

The difference between the current and future camera positions is transformed into a change in camera coordinates according to information in a coordinate translation database 28. Movement of the camera controller 14 is in discrete movement units in three directions: zoom, along a z-axis; pan, along a horizontal x-axis; and tilt, along a vertical y-axis. Movement along one of these three perpendicular axes affects the degree of movement necessary along the other axes. For example, pan or tilt movement at greater positive zoom translates into a larger movement in display coordinates than with a smaller zoom. A similar pan movement at a large tilt and a small tilt produces a smaller movement in display coordinates with the large tilt.

A change in the zoom is determined by the size of the object being tracked and its predicted position. The object must be sized in the field of view such that it is completely contained and there is sufficient area for the object to move without necessitating immediate movement of the camera 12 to maintain the object in the field of view.

Once zoom change has been calculated, tilt change values and then pan change values are determined based on vertical and horizontal display coordinate changes, respectively. If display coordinate changes are only in the vertical direction then a direct mapping of display coordinate change values to tilt change values can be performed. However, if there are horizontal and vertical changes then the horizontal changes must be compensated for when determining the vertical movement as objects that are horizontally distant require smaller tilt movement than appears to be necessary. After the tilt change has been calculated, the mapping for pan change necessary for movement of a single horizontal display coordinate changes accordingly.

The pan movement by the camera controller 14 according to the horizontal display coordinate change is determined after the zoom and tilt changes have been calculated. If there was no change in the vertical display coordinates then the horizontal display coordinate change can be mapped directly to a pan movement value based on the current zoom value. However, if there is both a horizontal and vertical display coordinate change then the tilt change value of the camera 12 must be compensated for.

Based on the PTZ (pan, tilt, zoom) movement coordinates, the movement calculator 26 creates control signals for the camera controller 14. A message containing an address for the camera controller 14, a command and an error check byte is sent to the camera controller 14 from the processing system 22 responsible for creating the camera movement commands. The camera controller address is a unique identifier that allows the processing system 22 to control and monitor multiple cameras. The error check byte is used to ensure that all command information was received by the camera controller 14. The command information may be a new position in PTZ coordinates that centers on the object. Alternatively, the command information may be a change in the current PTZ coordinate position such that, the change and not the final position is sent to the camera controller 14.

If an object that is being tracked rapidly moves out of the field of view of the camera 12 or veers off of the predicted path of movement, tracking continues for a predetermined number of frames based on the originally predicted path. The predetermined number of frames for which an original prediction is followed after an object is lost may be based on average speed of objects that are tracked by the system. If an object is not rediscovered after the predetermined number of frames then it is considered to have been lost. If the object is subsequently rediscovered it is considered to be a new object.

Figure 2:
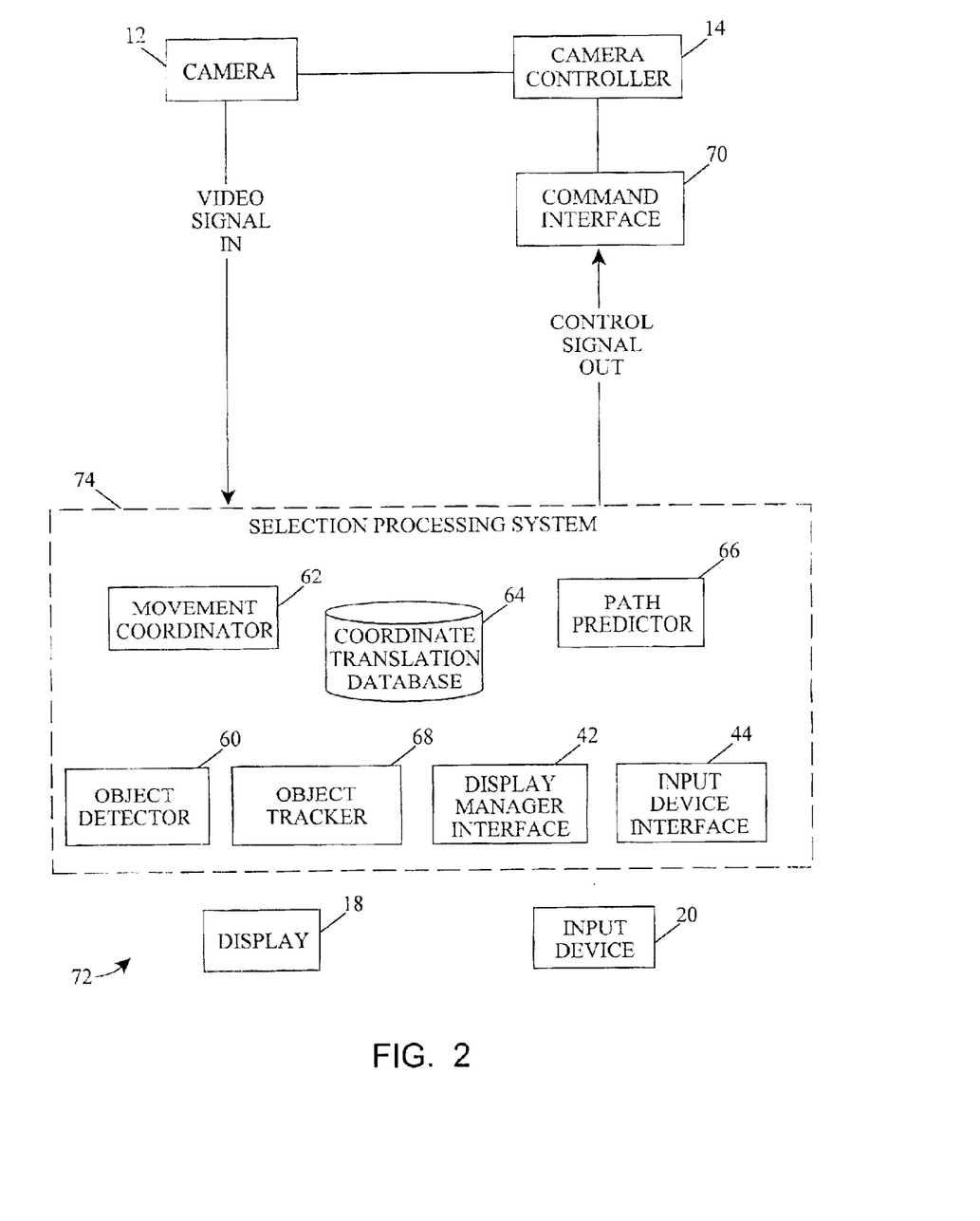
FIG. 2 is a system diagram of a monitoring system with a selection means and motion video camera provided in close proximity according to a second embodiment of the present invention.

FIG. 2 shows a monitoring system 72 with a selection means 74 and motion video camera 12 provided in close proximity. The system in FIG. 2 performs the same functions as the system 10 of FIG. 1; however, the camera 12 and the selection processing system 74 are not separated by a network 40. As a result, the functions of the camera processing system 22 from FIG. 1 may now be performed by the selection processing system 74. That is, the selection processing system 74 now includes the functions of object detection 60, movement coordination 62, path prediction 66, object tracking 68 and includes a coordinate translation database 64. These components all perform the same functions as their counter-parts by the same name in the camera processing system 22 of FIG. 1.

As there is minimal delay between the selection processing system 74 and the camera 12, the system 72 of FIG. 2 does not require video in database 30, latency determinator 50, translator 38 or network interfaces 36, 48.

Movement command signals generated by the movement coordinator 62 in the selection processing system 74 are received by a command interface 70 to the camera controller 14. The command controller 70 receives the signals and passes them to the camera controller 14 were the camera 12 is moved to maintain line of sight with an object.

Alternatively, the processing functions of object detection, movement coordination, path prediction and object tracking may be performed at the camera processing system with the selection processing system in close proximity (not shown). That is, for the selection processing system in close proximity to the camera 12 the camera processing system is in much the same form as the camera processing system 22 in FIG. 1 except without the components necessary for overcoming transmission latency (i.e. video in database 30, selection processing system interface 36, translator 38 and latency determinator 50).

FIGS. 1 and 2 illustrate an exemplary embodiment where an object of interest is selected by a user. Alternatively, objects of interest may be selected from the detected moving objects. A prescreening qualifier indicative of a characteristic of an object of interest is received and used to determine if a detected moving object is of interest based on whether or not these objects have a value for the characteristic represented by the prescreening qualifier. Based on a comparison technique, such as percentage error, the difference between the desired characteristic value (object of interest) and that for each detected moving object is determined. If the difference is within a predefined tolerance then the detected moving object is considered to be of interest. The process for selecting objects based on prescreening qualifiers representative of an object of interest is described in more detail in Applicant's copending application titled "Method and Apparatus for Object Tracking and Detection," filed concurrently herewith and incorporated herein by reference.

Figure 3:
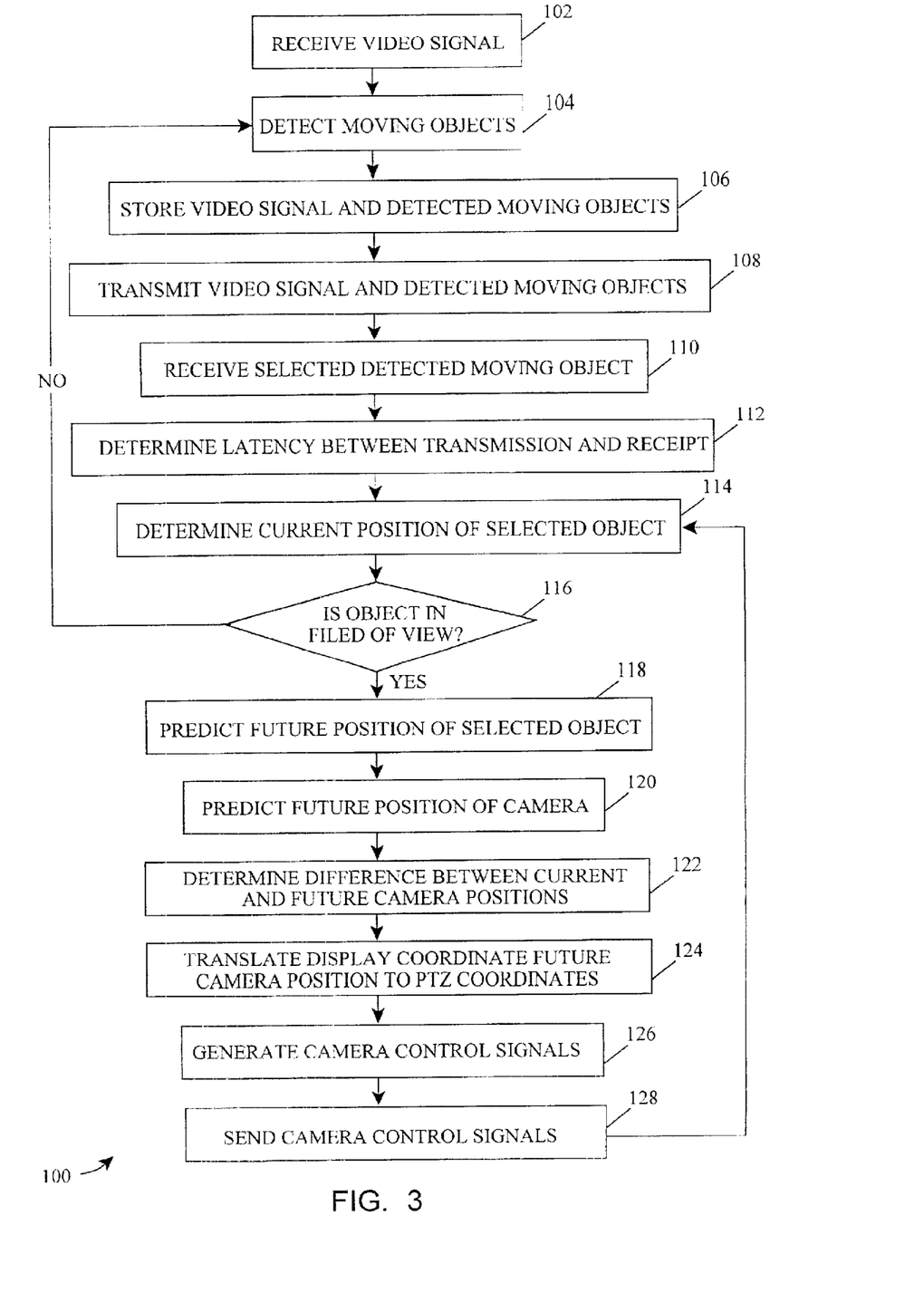
FIG. 3 is a flow chart illustrating an object monitoring method with a movable camera according to the first embodiment of the present invention.

FIG. 3 is a flow chart illustrating an object monitoring method 100 with a movable camera according to the first embodiment of the present invention, as shown in FIG. 1. The camera processing system 22 receives a video signal from the camera 12 in step 102. Using the video signal received, the camera processing system 22 detects moving objects in the field of view according to techniques known in the art in step 104.

Once moving objects have been detected the video signal and the detected moving objects are stored in step 106 in camera processing system 22 for use in later processing. The video signal and the detected moving objects are transmitted in step 108 to the selection processing system 16 where a user selects an object of interest. An indication of this selected object of interest is sent back to the camera processing system 22 and received in step 110.

When the indication of the selected object has been received by the camera processing system 22 a latency between the transmission and receipt time is determined in step 112. Determining the latency allows the system to use the object selected in a previous frame in tracking of an object in the current frame. The previously saved video signal is used to provide a position of the selected object at the time of selection. The position of the selected object can then be traced to a position in the current frame as determined in step 114.

If the selected object is still in the camera's 12 field of view, as determined in step 116, then the future position of the selected object can be predicted using the current position and movement parameters of the selected object such as velocity and acceleration in step 118. The future position of the selected object may be determined by a prediction algorithm such as a Kalman filter.

The camera processing system 22 determines a future position of the camera based on the future position of the selected object in step 120. The future position of the camera 12 keeps the selected object in the field of view. The future position of the selected object is expressed in coordinates of the display and its future corresponding camera coordinates.

The camera processing system 22 must determine a difference in step 122 current position of the camera and the future position of the camera to determine the amount of movement necessary to place the camera in the future position. This comparison may also be made in display coordinates.

As the camera controller 14 does not understand display coordinates, the difference calculated in step 122 must be translated into a coordinate system that will be understood by the camera controller 14 and can be used to move the camera 12 into the future position. The difference between the display coordinates of the current and future camera positions is translated into PTZ coordinates in step 124. These PTZ coordinates are used to generate camera control signals in step 126 that are sent to the camera controller in step 128.

After the camera 12 is moved to maintain the selected object in the field of view, the camera processing system 22 continues to monitor the current position of the selected object and move the camera 12 as necessary to maintain the object in the field of view.

If the selected object is no longer in the camera's 12 field of view then the camera processing system 22 continues to monitor the field of view and detect moving objects, step 104.

Figure 4:
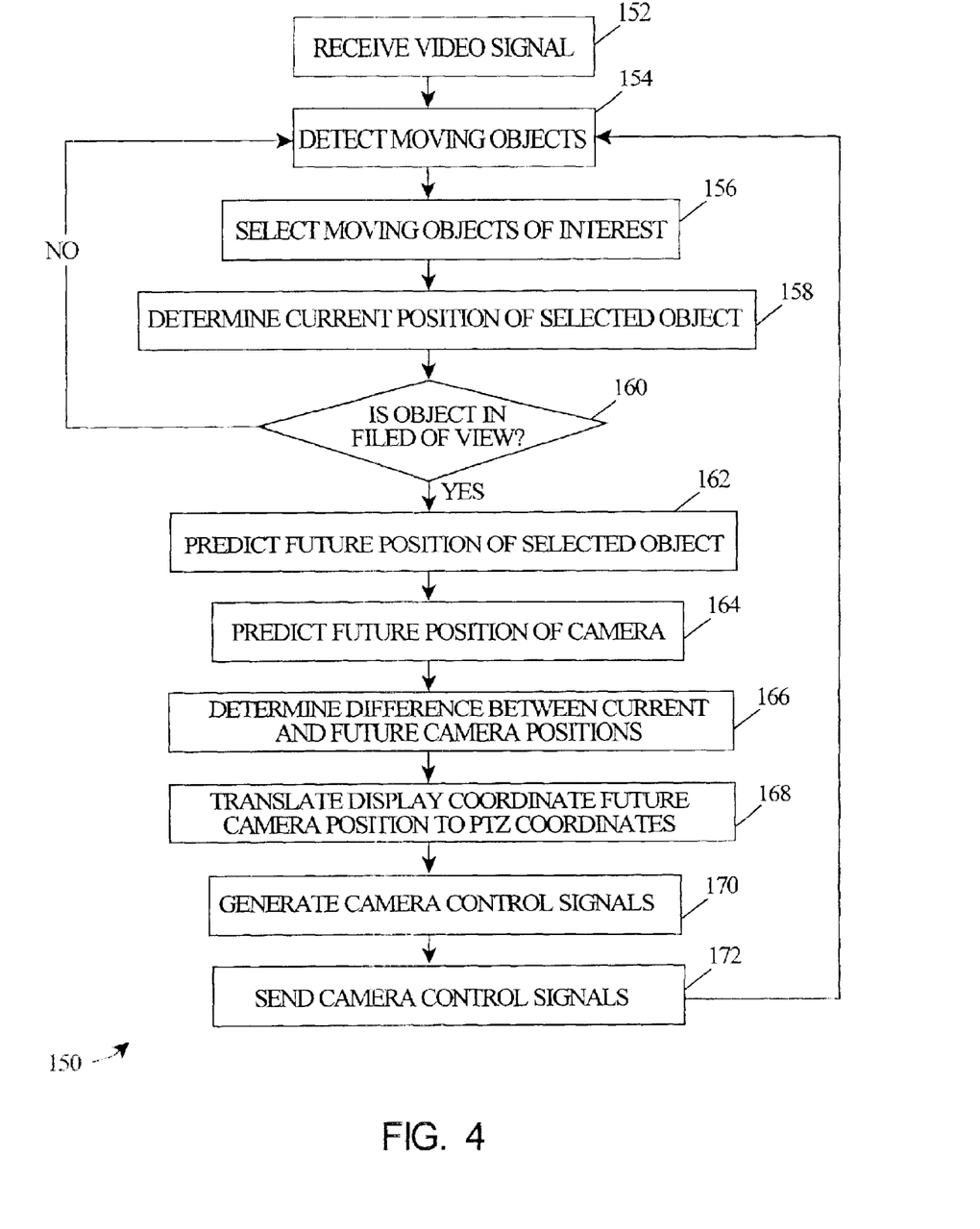
FIG. 4 is a flow chart illustrating an object monitoring method with a movable camera according to the second embodiment of the present invention.

FIG. 4 is a flow chart illustrating an object monitoring method 150 with a movable camera according to the second embodiment of the present invention, as shown in FIG. 2. The selection processing system 74 receives a video signal from the camera 12 in step 152. Using the video signal received, the selection processing system 74 detects moving objects in the field of view according to techniques known in the art in step 154.

A moving object of interest is selected from the detected moving objects in step 156. The selection may be the result of user selected or may be the result of automatic selection of objects based on a comparison with prescreening qualifiers.

The position of the selected object is determined in step 158. If the selected object is still in the camera's 12 field of view, as determined in step 160, then the future position of the selected object can be predicted using the current position and movement parameters of the selected object such as velocity and acceleration in step 162. The future position of the selected object may be determined by a prediction algorithm such as a Kalman filter.

The selection processing system 74 determines a future position of the camera 12 based on the future position of the selected object in step 164. The future position of the camera 12 keeps the selected object in the field of view. The future position of the selected object is expressed in coordinates of the display as is the future position of the camera.

The selection processing system 74 must determine a difference in step 168 current position of the camera and the future position of the camera to determine the amount of movement necessary to place the camera in the future position. This comparison may also be made in display coordinates.

As the camera controller 14 does not understand display coordinates, the difference calculated in step 166 must be translated into a coordinate system that will be understood by the camera controller 14 and can be used to move the camera 12 into the future position. The difference between the display coordinates of the current and future camera positions is translated into PTZ coordinates in step 168. These PTZ coordinates are used to generate camera control signals in step 170 that are sent to the command interface 70 of the camera controller 14 in step 172.

After the camera 12 is moved to maintain the selected object in the field of view, the selection processing system 74 continues to monitor the current position of the selected object and move the camera 12 as necessary to maintain the object in the field of view.

If the selected object is no longer in the camera's 12 field of view then the selection processing system 74 continues to monitor the field of view and detect moving objects, step 154.

Figure 5:
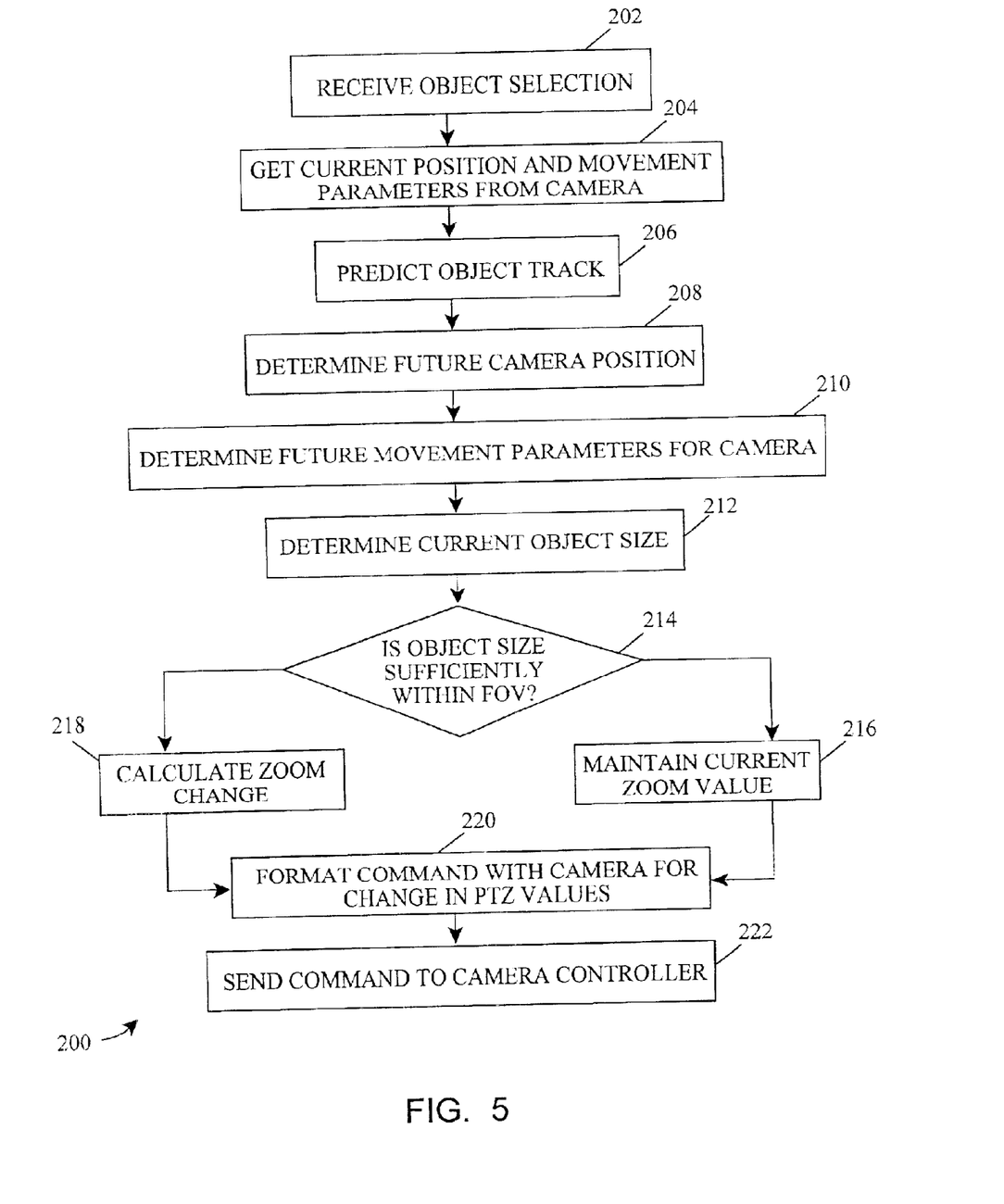
FIG. 5 is a flow chart illustrating movement of the camera according to an embodiment of the present invention.

FIG. 5 is a flow chart illustrating movement of the camera according to an embodiment of the present invention. An indication of selected objects and their movement information is received in step 202. The current position and movement parameters (i.e. velocity and acceleration) of the camera 12 are determined in step 204. The future position of the object being tracked is determined in step 206. Based on the future position of the object, the future position of the camera is determined in step 208 such that the object will remain within the field of view of the camera 12. The future movement parameters necessary to achieve the future position of the camera 12 are determined in step 210. These movement parameters are based on the horizontal and vertical changes in the object and thus are a rough estimate of the pan and tilt changes of the camera 12. The size of the object, determined in step 212, is examined to determine in step 214 if the object is sufficiently in the field of view such that the entire object is visible and will remain visible with the predicted future position. If the object size is sufficient then the zoom value is maintained in step 216 and a command is formatted with the pan and tilt changes. If the object size is not sufficient then a new zoom value is determined in step 218 such that the object will be sufficiently within the field of view. A command incorporating the pan, tilt and zoom changes is formatted in step 220 and sent to the camera controller 14 in step 222.

It is apparent to one skilled in the art that numerous modifications and departures from the specific embodiments described herein may be made without departing from the spirit and scope of the invention.

What is claimed is:

1. A method for holding an object of interest in a field of view of a movable video camera, the object of interest being selected from a plurality of moving objects detected in the field of view, said method comprising the steps of:

receiving an indication of the object of interest;

predicting a future position of the object of interest based on a current position and movement parameters of the object of interest;

determining a future position of the movable camera based on said future position of the object of interest, said future position of the movable camera having the object of interest in the field of view; and generating movement signals for the movable camera based on a difference between a current position of the movable camera and said future position of the movable camera.

2. The method of claim 1 wherein said movement parameters includes the parameters of velocity and acceleration of the object of interest.

3. The method of claim 1 wherein said step of generating includes the steps of:

determining a difference between said current position of the movable camera and said future position of the movable camera; and creating control signals to move the movable camera said difference.

4. The method of claim 3 wherein said difference is determined in a display coordinate system used for representing objects in the field of view, and the method further comprises the step of:

translating said difference in said display coordinate system to a difference in a camera controller coordinate system; and wherein said step of creating control signals includes the step of creating control signals based on said difference in said camera controller coordinate system.

5. A method for holding an object of interest selected by a user in a field of view of a movable camera, the movable camera producing a video signal representative of the field of view, said method comprising the steps of:

detecting moving objects in the video signal;

transmitting an indication of said detected moving objects and the video signal at a first time point;

receiving an indication of the selected object of interest at a current time point;

translating said indication of the selected object of interest from the video signal transmitted at said first time point to an object in the video signal at said current time point;

predicting a future position of said selected object of interest based on a current position and movement parameters of said selected object of interest;

determining a future position of the movable camera based on said future position of said selected object of interest; and generating movement signals for the movable camera based on a difference between a current position of the movable camera and said future position of the movable camera.

6. The method of 5 wherein said step of translating further includes the steps of:

determining a difference between said first time point and said current time point; and determining a current location of said selected object of interest at said current time point based on said received indication taken at said first time point and said difference between said first time point and said current time point.

7. The method of claim 5 wherein said movement parameters includes the parameters of velocity and acceleration of the object of interest.

8. The method of claim 5 wherein said step of generating includes the steps of:

determining a difference between said current position of the movable camera and said future position of the movable camera; and creating control signals to move the movable camera said difference.

9. The method of claim 8 wherein said difference is determined in a display coordinate system used for representing objects in the field of view, and the method further comprises the step of:

translating said difference in said display coordinate system to a difference in a camera controller coordinate system; and wherein said step of creating control signals includes the step of creating control signals based on said difference in said camera controller coordinate system.

10. The method of claim 6 further including the step of storing the video signal received between said first time point and said current time point.

11. The method of claim 10 wherein said step of determining a said current location of said selected object of interest includes the step of determining a position of said selected object of interest at said first time point from said stored video signal;

mapping said position of said selected object of interest at said first time point to said current position.

12. A system for holding an object of interest in a field of view of a movable video camera, the object of interest being selected form a plurality of moving objects detected in the field of view, said system comprising:

a selector for selecting the object of interest;

means for predicting a future position of the object of interest and a coordinating future position of the movable video camera;

a movement coordinator for creating movement signals to move the movable video camera to said future position from a current position.

13. The system of claim 12 wherein said future position of the movable camera is in a display coordinate system used for representing objects in the field of view, and said movement coordinator includes a coordinate translation database storing a mapping of display coordinates to camera controller coordinates for translating said future position said movable camera in said display coordinate system to a future position in a camera controller coordinate system; and wherein said movement signals are created in said camera controller coordinate system.

14. A system for holding an object of interest selected by a user in a field of view of a movable camera, the movable camera producing a video signal representative of the field of view, said system comprising:

an object detector for detecting moving objects in the field of view of the video camera;

means for transmitting and receiving video information for transmitting the video signal and said detected moving objects and receiving an indication of the selected object of interest;

a translator for determining an object of interest at a current time point based on a video signal transmitted at a first time point and said indication of the selected object of interest received at said current time point;

means for predicting a future position of the object of interest and a coordinating future position of the movable video camera;

a movement coordinator for creating movement signals to move the movable video camera to said future position from a current position.

15. The system of claim 14 wherein said future position of the movable camera is in a display coordinate system used for representing objects in the field of view, and said movement coordinator includes a coordinate translation database storing a mapping of display coordinates to camera controller coordinates for translating said future position said movable camera in said display coordinate system to a future position in a camera controller coordinate system; and wherein said movement signals are created in said camera controller coordinate system.

16. The system of claim 14 wherein said translator further includes a video database for storing the video signal received between said first time point and said current time point.

17. A computer readable medium having stored thereon computer-executable instructions for holding an object of interest in a field of view of a movable video camera, the object of interest being selected from a plurality of moving objects detected in the field of view performing the steps comprising:

receiving an indication of the object of interest;

predicting a future position of the object of interest based on a current position and movement parameters of the object of interest;

determining a future position of the movable camera based on said future position of the object of interest, said future position of the movable camera having the object of interest in the field of view; and generating movement signals for the movable camera based on a difference between a current position of the movable camera and said future position of the movable camera.

18. The computer readable medium of claim 17 wherein said movement parameters includes the parameters of velocity and acceleration of the object of interest.

19. The computer readable medium of claim 17 wherein said step of generating includes the steps of:

determining a difference between said current position of the movable camera and said future position of the movable camera; and creating control signals to move the movable camera said difference.

20. The computer readable medium of claim 19 wherein said difference is determined in a display coordinate system used for representing objects in the field of view, and the method further comprises the step of:

translating said difference in said display coordinate system to a difference in a camera controller coordinate system; and wherein said step of creating control signals includes the step of creating control signals based on said difference in said camera controller coordinate system.

21. A computer readable medium having stored thereon computer-executable instructions for holding an object of interest selected by a user in a field of view of a movable camera, the movable camera producing a video signal representative of the field of view performing the steps comprising:

detecting moving objects in the video signal;

transmitting an indication of said detected moving objects and the video signal at a first time point;

receiving an indication of the selected object of interest at a current time point;

translating said indication of the selected object of interest from the video signal transmitted at said first time point to an object in the video signal at said current time point;

predicting a future position of said selected object of interest based on a current position and movement parameters of said selected object of interest;

determining a future position of the movable camera based on said future position of said selected object of interest; and generating movement signals for the movable camera based on a difference between a current position of the movable camera and said future position of the movable camera.

22. The method of 21 wherein said step of translating further includes the steps of:

determining a difference between said first time point and said current time point; and determining a current location of said selected object of interest at said current time point based on said received indication taken at said first time point and said difference between said first time point and said current time point.

23. The computer readable medium of claim 21 wherein said movement parameters includes the parameters of velocity and acceleration of the object of interest.

24. The computer readable medium of claim 21 wherein said step of generating includes the steps of:

determining a difference between said current position of the movable camera and said future position of the movable camera; and creating control signals to move the movable camera said difference.

25. The computer readable medium of claim 24 wherein said difference is determined in a display coordinate system used for representing objects in the field of view, and the method further comprises the step of:

translating said difference in said display coordinate system to a difference in a camera controller coordinate system; and wherein said step of creating control signals includes the step of creating control signals based on said difference in said camera controller coordinate system.

26. The computer readable medium of claim 22 further including the step of storing the video signal received between said first time point and said current time point.

27. The computer readable medium of claim 26 wherein said step of determining a said current location of said selected object of interest includes the step of determining a position of said selected object of interest at said first time point from said stored video signal;

mapping said position of said selected object of interest at said first time point to said current position.

\* \* \* \* \*